May 30, 1944.     H. R. BLACK     2,350,011
FILTERING AND FILTERING APPARATUS
Filed Aug. 12, 1940     2 Sheets-Sheet 1
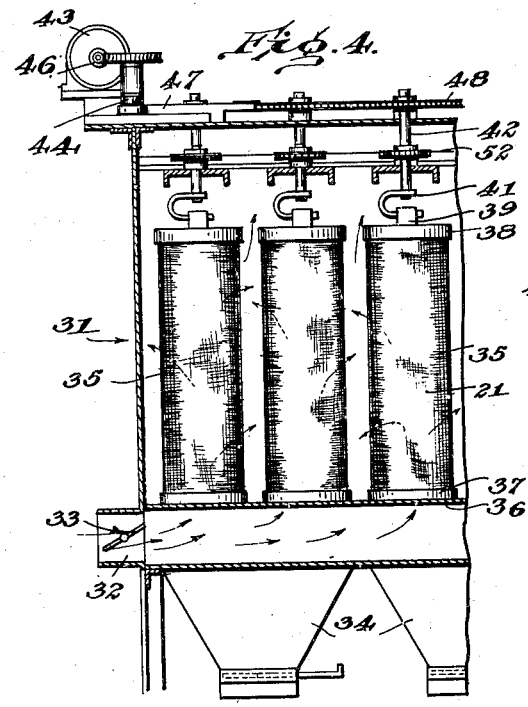
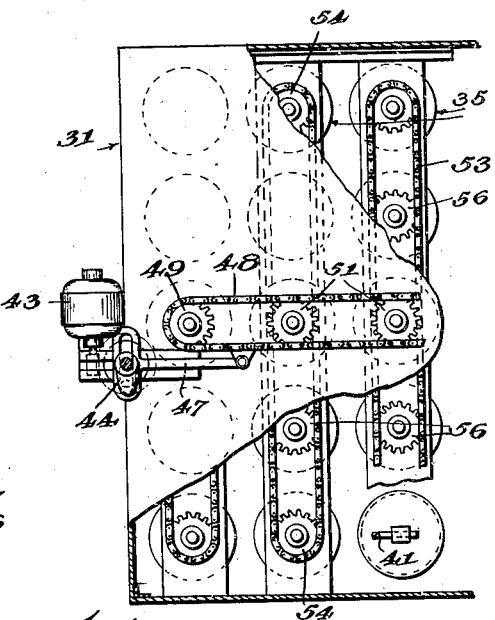
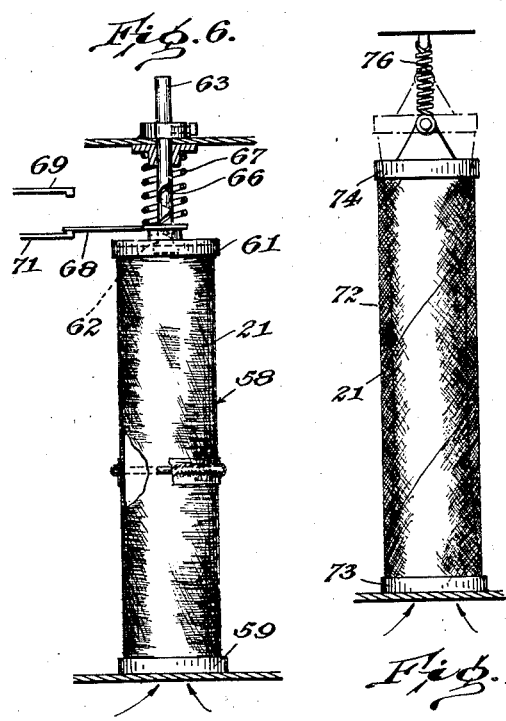
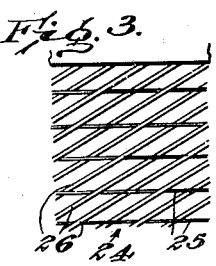
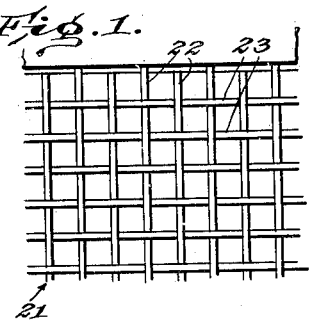
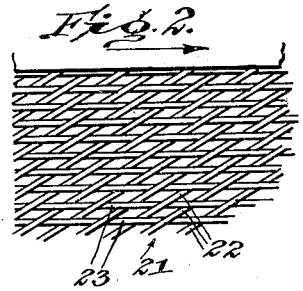
Henry R. Black
INVENTOR
BY
ATTORNEY May 30, 1944. H. R. BLACK 2,350,011
FILTERING AND FILTERING APPARATUS
Filed Aug. 12, 1940 2 Sheets-Sheet 2
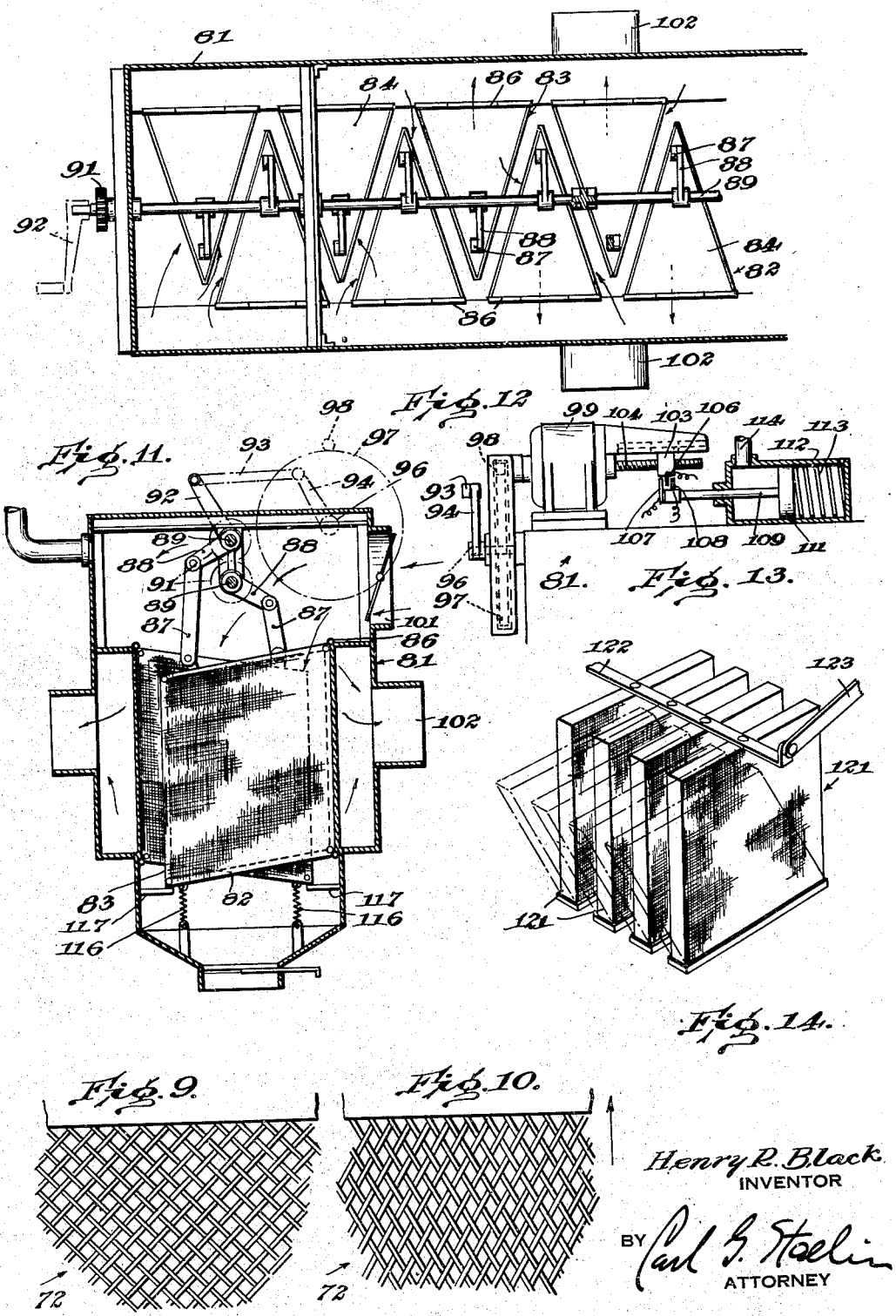
Henry R. Black
INVENTOR
BY
ATTORNEY Patented May 30, 1944

2,350,011

UNITED STATES PATENT OFFICE 2,350,011

FILTERING AND FILTERING APPARATUS

Henry R. Black, Toledo, Ohio, assignor to Owens-Corning Fiberglas Corporation, a corporation of Delaware Application August 12, 1940, Serial No. 352,203

7 Claims. (Cl. 183—52)

This invention relates to filter apparatus and method of filtering, and more particularly to improved filter media and method for collecting dust.

At the present time there are several different fundamental procedures used to filter out and collect dust and other finely divided material from fluids and gases. One method is to employ a tightly woven filter cloth of fine diameter threads or strands so that the small interstices thus formed will prevent all, or substantially all, of the dust particles from passing through. Another method that is similar to the above employs a fuzzy type of thread, and the interstices while not so small are covered by projecting fuzz. Both of these have the shortcoming that many types of dust adhere tenaciously to the threads and gradually completely block up the interstices. It is also difficult to remove the dust from the filter.

A still further procedure relies upon the dust itself to do the filtering, since a properly porous dust cake is one of the best filters known for dust. Sometimes this cake is formed artificially by adding a suitable dust to the air drawn into the filter unit at the beginning of the operation; at other times, it is allowed to build up from the dust drawn into the filter during operation. The shortcomings of this type of filter are: one, the difficulty of starting a cake; two, the difficulty of removing the cake; three, the loss of collecting efficiency after removing the cake and before it again becomes effective as a filter; and, four, the difficulty of maintaining the cake in a proper porous condition to allow the passage of air therethrough. It is common practice to shut down this type of equipment when too solid a cake is built up and violently shake the bags or other type of filtering media to remove the cake. This results in excessive wear and short life of the filter.

The present invention obviates the above-mentioned difficulties by providing a filter medium in which the threads or strands bounding the interstices are made to move relative to one another and generally speaking in the plane of the interstice so that when too impervious a cake is formed the strands may be moved to detach the cake or to remove part of the cake and loosen the remainder to obtain the proper porosity in it. Such movement may also take place during operation to maintain proper filtering action at all times.

One of the objects of this invention is the provision of a filter medium in which the size of the interstices can be adjusted after installation of the medium in the filter unit to adapt the filter for different sizes of dust particles and to enable quick starting of a cake with dusts of different particle sizes and filtering characteristics.

A second object of this invention is the provision of a filter medium in which the bounding members of the interstices can be moved in relation to one another during operation of the filter unit, to keep the dust cake sufficiently porous to allow passage of air without an excessive pressure drop and without permitting an excessive amount of dust to pass through the medium.

A third object of this invention is to reduce the "downtime" of the filter unit by the provision of a filter medium which allows the formation of a thicker dust cake than is now possible while maintaining the same sufficiently porous to prevent loss of dust collecting efficiency, and by providing a means of quickly and effectively removing the cake.

A fourth object of this invention is the provision of a filter medium which allows the formation of a cake sufficiently thick to fall away from the medium without excessive shaking of the filter.

A fifth object of this invention is the provision of a filter medium for dust collecting purposes which allows removal of the dust cake evenly from over the entire surface without any violent shaking of the filter while leaving a sufficient bed of porous cake on the medium to insure maintenance of collecting efficiency.

A sixth object of this invention is the provision of a filter medium of the type set forth which will permit a less expensive and more compact construction of the filter unit by eliminating the necessity for violent shaking or rapping of the medium and by reducing the required movement of the medium as a whole to a minimum; and, It is a further object of the present invention to provide an improved method of filtering solid material from fluids, and particularly, of filtering dust from air and other gas.

Additional objects of this invention will be apparent from the following description and drawings wherein:

Figure 1 is an enlarged detail view of a portion of a filter medium constructed in accordance with my invention;

Figure 2 is a view similar to Figure 1, showing the distortion achieved by movement of the upper end of the medium laterally;

Figure 3 is a similar view of a modified form of medium;

Figures 4 and 5 are side elevational and plan views respectively, partly in section and illustrating one method of using my invention;

Figure 6 is a side elevational view partly in section of an alternative construction embodying the present invention;

Figure 7 is a side elevational view partly in section of another alternative construction in which the filter medium employed is cut and sewn on a bias;

Figure 8 is a side elevational view partly in section illustrating an alternative construction employing the filter medium of Figure 7;

Figure 9 is an enlarged detail view of a portion of the filter medium illustrating its arrangement as used in Figures 7 and 8;

Figure 10 is a view similar to Figure 9 showing the distortion achieved by extending the filter medium;

Figures 11 and 12 are vertical cross-sectional and horizontal cross-sectional views respectively, illustrating another embodiment of my invention;

Figure 13 is a side elevational view partly in section of the operating means for the filter illustrated in Figure 11; and Figure 14 is a perspective view of another form of filter apparatus embodying the present invention.

Referring to the drawings more in detail, and especially to Figures 1 and 2, the woven filter medium 21 has vertical threads 22 normally disposed at right angles to the horizontal threads 23. With this relation of the threads the size of the interstices is the maximum for the weave employed.

In accordance with the present invention the dust cake is removed from the surface of the filter medium by causing relative movement between the threads or strands of the filter medium. This movement is made to take place preferably in more than one direction along the surface of the media, the strands moving lengthwise relative to each other and laterally toward and from each other. The lengthwise movement produces a shearing action between adjacent threads, and both the lengthwise movement and the lateral movement produce a relative movement between the threads and the dust cake. This causes the dust cake to break up and to be loosened from the threads so that it will fall away from the medium. Simultaneously, the movement between the threads and the movement between the threads and the cake also disturb the particles of dust of the remaining cake and loosens the cake to increase its porosity.

The movement between the strands may be effected in several ways. In the medium shown in Figures 1 and 2 the upper end of the medium is translated laterally relative to the lower end in a direction substantially parallel with the plane of the medium and while the medium is taut to impart the desired movement to the threads. This translation causes the vertical threads to approach each other and to be moved relatively to each other in the direction of their lengths. The same composite movement is imparted to the horizontally extending threads so that the threads bounding each interstice define a parallelogram that reduces in shape and area as the threads are moved. This phenomenon is illustrated in Figure 2. The reduction in area of the interstices resulting from the relative lateral translation between the ends of the medium permits the medium to be adjusted for collecting dusts of different nature and particle size and to aid in starting a dust cake on the filter. Reverse movement of the threads with consequent increase in interstice area and change in shape is obtained when moving the upper portion of the medium in the reverse direction back to the position shown in Figure 1.

While there are several organic and inorganic filaments, threads, or strands suitable for making the filter medium, I have found that excellent results are obtained by using glass fiber threads for the reason that not only do they have great tensile strength, but also their smooth nature and firmness aids in moving the bounding members of the interstices most effectively without the application of excessive force to the medium.

The threads of a woven medium are limited in their movement toward one another by the thickness of the threads and the tightness of the weave. To obtain a greater amount of relative movement of the threads it is sometimes desirable to use a relatively loose weave and with fewer horizontal threads than vertical, or with smaller horizontal threads than vertical, or to use soft and resilient threads in either horizontal or vertical direction. It is also possible to use a fabric having parallelly related threads extending in only a single direction similar to tire cord fabrics. Figure 3 illustrates a medium 24 in which the horizontal threads 25 are of less diameter than the vertical threads 26 and are more widely spaced. This type of material permits a greater amount of relative movement between the threads.

I have found that the textile constructions best adapted to the present invention are those in which the threads extending in one direction "float" for the extent of two or more of the threads extending in the other direction, passing under or over them, or in which two or more parallel threads are woven as a unit.

In Figures 4 and 5, I have illustrated a form of filtering equipment in which filtering bags embodying my invention are employed. A housing 31 has a usual air inlet passage 32 provided with an inlet valve 33 and is provided with collected dust hoppers 34. The housing encloses a plurality of tubular bags 35, each communicating at one end with the air inlet passage. Each bag is formed of a piece of filter medium 21 in tubular form, the lower end of the tube being secured to a base plate 36 by suitable means including the clamp ring 37. The upper end of the bag is secured to a cover 38 having a loop 39 thereon through which one leg of a U-shaped spring 41 is received. The upper end of the spring is secured to a vertically positioned rotatable shaft 42 and acts to maintain the bag under sufficient tension to keep it taut.

A motor 43 mounted on the housing rotates a crank 44 through gearing 46. The crank pin is received in a slot in a slide 47 mounted for reciprocation on the housing and having articulation with an endless sprocket chain 48. The sprocket chain is received about sprocket wheels 49 mounted on the end ones of a series of the shafts 42 that are in alignment lengthwise of the housing. The chain also has driving connection with sprocket wheels 51 on the other shafts in the series. When the crank 44 is rotated it acts to reciprocate the slide and through the chain 48 oscillates all of the shafts in the series. Each of the driven shafts 42 is provided with a second sprocket wheel 52 that meshes with one of a series of endless sprocket chains 53. Each chain 53 is received about sprocket wheels 54 mounted on end ones of a series of the shafts 42 that are in alignment crosswise of the housing and has driving connection with sprocket wheels 56 on the intermediate shafts in the series. By this arrangement all of the shafts are rotated in unison by the motor.

The cycle of operation with the type of equipment illustrated is to shut off the inlet valve 33 after a collecting period and cause the motor 43 to run for a predetermined time to oscillate the top portions of the bags to cause relative movement of the threads of the medium as heretofore described to loosen the dust cake so that it will fall from the inside of the bags into the hoppers. After this, the inlet valve is opened again and another collecting period commenced.

Very little power is necessary to oscillate these bags for the reason that they are twisted relatively slowly. There is no need of heavy shaking and beating equipment so commonly used in commercial dust filtering. It will be obvious that as there need be no severe shaking, a uniform filter bed of dust may remain on the medium and since every square inch of the cloth is affected by the relative movement of the threads of the medium, porosity will be imparted to this dust cake which will be substantially uniform throughout, and the entire surface of the filter medium will be maintained more free for the passage of air than is possible with any beater or shaker now in use. By increasing or decreasing the angle through which the top of the bag is rotated the threads of the medium will be moved to greater or lesser extent and the amount of dust removed thereby varied.

Because of the fact that with this construction the bag merely rotates through a predetermined angle, the actuating means can be lighter and may be less expensive than that used in prior constructions to shake the bags. In addition, since the bags have no lateral movement as would be imparted by shaking, the housing can be smaller and does not have to be made to withstand a large amount of vibration.

In Figure 6 is illustrated a bag 58 made from the filter medium 21 of my invention and fixed at its lower end by a clamp ring 59 to a stationary part of a housing. At its upper end a disk 61 is suitably secured to the bag, the disk having a centrally located bore 62 extending therethrough. A rod 63 is adjustably fixed by a set screw in a collar secured to the top of the housing and extends through the aperture in the disk 61. The rod has a spiral groove 66 thereon which is engaged by a suitable lug extending inwardly from the wall of the bore in the disk. Initially, the bag is twisted so that the threads of the medium are substantially in the relation shown in Figure 2. The bag is held resiliently in this position by a compression spring 67 seating against the upper side of the disk and the lower side of the top wall of the housing.

In operation the pressure of air inside the bag tends to extend the bag and cause it to untwist. This untwisting movement causes the disk to move up on the rod 63 due to the coaction between the lug in the bore 62 and the spiral groove 66. However, during the first portion of the dust collecting operation the pressure inside the bag is insufficient to overcome the pressure of the spring 67 and the bag remains twisted to initial extent. As the cake builds up over the inner surface of the bag the pressure in the bag increases and the bag partially untwists against the action of the spring. This untwisting causes the threads to be moved as heretofore described and the cake is disturbed to increase its porosity.

Depending upon the type of dust collected this increase in porosity may be sufficient to cause a drop in pressure in the bag of a degree that will permit retwisting of the bag by the spring pressure, or may be of a degree that will cause the expansion and untwisting of the bag to cease temporarily. Further, the untwisting may take place step-by-step as last mentioned or may be continuous depending on the type of dust collected and the rate of collection.

When the bag has untwisted to full extent, in which position of the bag the threads of the medium are substantially in the relation shown in Figure 1, a contact finger 68 suitably connected to the disk 61 engages a stationary contact 69. Closing of contacts 68 and 69 may be made to shut off the flow of dust laden air to the bag, for instance, by closing an inlet valve, whereupon the bag is again twisted by the pressure of the spring 67. During the twisting the threads are again moved relative to each other as heretofore described, causing the cake to be loosened and to fall away from the interior surface of the bag, and to increase the porosity of any cake remaining on the bag. At the completion of twisting the threads of the medium are in the relation shown in Figure 2 with sufficient of the cake removed and the remainder of the cake conditioned for another dust collecting cycle. At the end of the twisting movement the contact 68 engages a contact 71. The closing of these contacts may be arranged to permit flow of dust laden air into the bag as by opening an inlet valve. The automatic cycle is then repeated.

In Figures 7 and 8 another modification is shown in which the filter medium is arranged on the bias, and the movement of the threads bounding the interstices is effected by an extension or contraction of the bag. Referring to Figure 7, a strip of the medium 21 is arranged spirally and joined along its edges to form a tube 72, the lower end of which is secured to a base plate by a clamp ring 73 in suitable manner. The upper end of the bag is fixed to a cover 74 to which one end of a spring 76 is secured. The other end of the spring is secured to a part of the housing and the spring normally keeps the bag in an extended position as represented by dotted lines so that the openings in the medium have the appearance of that shown in Figure 10. When sufficient cake is formed in the bag the pressure will overcome the tension of the spring 76 and extend the sides of the bag, and in so doing, cause relative movement of the threads of the filter medium. This movement of the threads will act as previously described to disturb and crack the cake and cause sufficient of the cake to be loosened to decrease the pressure of the air in the bag. The distortion of the bag causes the threads of the medium to approach or pass the relation thereof shown in Figure 9. When the pressure in the bag is reduced the spring will return the bag to a position in which the interstices are as shown in Figure 10, the movement of the threads to this relation causing further loosening of the cake. Thus, the automatic contraction and expansion of the bag maintains the porosity of the cake. This arrangement may also be provided with the usual means for shutting off the air flow when desired.

A bag 78 similar to the one shown in Figure 7 is illustrated in Figure 8 as having a tubular section 79 of flexible rubber fixed to each of its ends. The bag may be installed in a stretched relation between fixed portions of the housing so that in the absence of air pressure in the bag the filter medium takes the form illustrated by the dotted lines in Figure 7. As the pressure builds up the bag expands circumferentially, the rubber sections are further stretched both axially and circumferentially, and the filter medium gradually takes the form illustrated in Figure 8 or may even expand to greater extent. An advantage of this arrangement lies in the fact that the ends of the bag are not constrained to fixed diameters by the end connections, but are allowed to assume a more uniformly cylindrical shape with the result that the distortion is more even over the entire surface of the filter medium. This arrangement may also be fitted with means to shut off the flow of air in the manner heretofore described.

In Figures 11, 12 and 13 I have shown another type of filtering equipment embodying my invention. This comprises a housing 81 having a plurality of bags 82 therein. These bags consist of pieces of filter medium stretched over the open rectangular faces of frames 83 which are shown triangular in cross section but which may be of rectangular or any other convenient cross-sectional form. Preferably, the crossing threads normally extend at acute angles to each other as shown in Figure 2. The frames 83 are closed at each end with triangular shaped plates 84 pivotally interconnected and connected to the housing 81 by hinges 86. The upper plates 84 of the frames are connected by links 87 to the outer ends of levers 88 fixed at their inner ends to rock shafts 89 rotatably mounted in the housing. Meshing gears 91 are fixed to the ends of the rock shafts to cause the shafts to rotate in unison. The end of the upper rock shaft has a lever 92 fixed thereto which has its outer end connected by a link 93 with the outer end of a lever 94 fixed to a shaft 96 rotatably mounted in the housing. The shaft 96 has keyed thereto a gear 97 which is meshed by a pinion 98 on the shaft of a motor 99 mounted on the housing.

Dust laden air enters at the inlet 101, passes through the filter medium on the frames, and the cleaned air leaves through the outlet passages 102, the dust having been deposited on the outer surface of the filter medium. As the motor 99 is rotated the rock shafts 89 are turned and the frames 83 are drawn upwardly to cause the threads of the filter medium to be moved as hereinbefore described, loosening and disturbing the dust cake on the outer surface of the medium and maintaining its porosity.

Means for automatically controlling the movement of the filter frames comprises a nut 103 threaded to an extension 104 of the motor shaft and held slidably against rotation. An electrical contact 106 carried by the nut is adapted to be engaged by either of two contacts 107, 108 mounted on a reciprocably mounted rod 109 fastened at one end to a piston 111. The piston is received in a cylinder 112 and is urged toward the forward end of the cylinder by a spring 113. The interior of the cylinder in advance of the piston is connected by a line 114 with the interior of the housing 81.

As the cake on the filter medium builds up and the pressure in the housing increases, the piston is moved rearwardly against the action of the spring 113 and moves the contact 107 into engagement with the contact 106. The motor thereupon begins to rotate in a forward direction, raising the frames, and by the relative movement of the threads loosening the dust cake on the filter medium. The nut 103 is moved by rotation of the motor in the same direction as the piston is moved by the pressure in the cylinder, and the contacts 106, 107 remain in engagement until the loosening of the cake causes the pressure to drop to a value where the piston no longer is moved against the spring. The contact on the nut then moves away from the contact 107 and the motor stops. The frames are now held in partially raised position until the cake again builds up and the pressure increases, whereupon the contacts 106, 107 again engage and the motor is again rotated to cause loosening of the cake. In some instances, depending upon the nature of the dust and the rate of collection, the frames may be raised continuously instead of this step-by-step action.

The raising of the frames continues until the frames are fully raised at which time the valve in the inlet passage may be closed either automatically or manually. Upon closing of this valve and consequent drop of pressure in the housing, the piston is moved to the right and the contacts 106, 108 are closed. The motor 99 now rotates in reverse direction and continues to do so as long as the air is shut off from the housing and until the piston reaches the end of its stroke at which time the frames have been returned to lowered position. At the end of the stroke of the piston the contacts 106, 108 separate due to movement of the nut and the motor is stopped. During return of the frames to lowered position the dust cake is loosened by movement of the threads of the medium and it falls into the hopper beneath the frames. The valve in the inlet passage is then opened, either automatically or manually and the dust collecting cycle again started.

If desired the motor 99 may be unclutched from the frame raising means by any suitable means at the end of the raising movement of the frames and the frames allowed to be drawn down quickly by springs 116 against stops 117. The jarring of the frames against the stops further loosens the dust cake from the medium.

The filtering arrangement of Figure 14 employs a series of rectangular frames 121 that may be employed in apparatus similar to that shown in Figures 11 and 12. The rectangular frames are covered with filter media preferably so arranged that the threads are normally in the relation illustrated in Figure 2. As the cake of dust particles builds up on the medium the upper ends of the frames are moved translatively toward one end of the frames by suitable mechanism including the bar 122 and link 123. The consequent movement of the threads as hereinbefore described causes loosening and disturbance of the cake of dust.

Although the present invention has been described in connection with filtering dust from air, it may, of course, be employed for filtering other material from gas and liquids.

My invention not only provides a more efficient method of filtering and increases the efficiency of the filter unit itself by proper control of the dust cake, but also increases the life of the filtering equipment and the filter medium because no violent shaking of the bag is necessary.

Various changes and modifications may be made within the scope of the present invention as defined by the claims.

I claim:

1. An apparatus for filtering air comprising woven filter medium through which air to be filtered is passed, the threads of said medium being adapted to be moved relative to each other upon relative translation of opposite edges of the medium in the general direction of said edges, means for relatively translating said edges in one direction for adjusting the openings through said medium to initially build up a dust cake in association with said filter medium, and means to relatively translate said edges in the opposite direction during the operation of said apparatus to increase the size of said openings to maintain a predetermined porosity in said dust cake to allow the passage of a proper amount of air.

2. Filtering apparatus comprising a filter bag of woven cloth open at one end, the threads of the cloth being movable relatively to each other upon relative translative movement of opposite edges of the cloth in the plane of the cloth, a support for the bag, means for conducting fluid to be filtered into the open end of the bag to cause particles of solid material to be deposited on the interior of the bag, a spiral cam connection between one end of the bag and the support whereby angular movement of said end causes extension of the bag in the direction of its length, and resilient means acting on the bag to urge the bag into contracted and twisted position so that as the pressure increases inside the bag it is extended against the action of the resilient means, the spiral cam connection causing angular movement of one end of the bag during such extension to impart relative movement to the threads to thereby disturb the deposited material on the cloth.

3. Filtering apparatus comprising a substantially tubular filter bag formed of woven cloth arranged with its strands oblique to the axis of the bag, the threads of the cloth being arranged to be moved relative to each other upon extension and contraction of the bag, a spring acting on the bag to resiliently hold it in extended position with the threads of the cloth moved relatively toward each other to decrease the size of the interstices in the cloth, and means for conducting fluid to be filtered into said bag to cause solids in the fluid to be deposited on the cloth, the increase in pressure in the bag due to the depositing of the solids on the bag causing said bag to expand diametrically and thereby be contracted against the action of said spring to impart relative movement to the threads of the cloth to thereby increase the size of the interstices in the cloth and disturb the material deposited on the bag.

4. Filtering apparatus comprising a tubular filter bag formed of woven cloth arranged with its strands oblique to the axis of the bag, the threads of the cloth being arranged to be moved relative to each other upon lengthwise extension and contraction of the bag, spaced supports between which the bag is mounted, resilient means connecting one end of the bag to the support to resiliently hold the bag in extended position with the threads of the cloth moved relatively toward each other to decrease the size of the interstices in the cloth, and means for conducting fluid to be filtered into said bag to cause solids in the fluid to be deposited on the cloth, the increase in pressure in the bag due to the depositing of the solids on the bag causing said bag to expand diametrically and thereby be contracted in length against the action of said resilient means to impart relative movement to the threads of the cloth to thereby increase the size of the interstices in the cloth and disturb the material deposited on the bag.

5. The process of filtering dust laden air which comprises placing a woven filter cloth under biasing tension to cause the parallel threads of the cloth to approach each other and thereby reduce the size of the interstices of the cloth, passing dust laden air through said cloth while under such tension to cause the dust to be deposited on the cloth, causing relative translative movement in unbiasing direction between opposite edges of the cloth progressively during the filtering operation and as the dust deposited on the cloth increases to cause the threads thereof to move away from each other and thereby increase the size of the interstices in the cloth for maintaining the porosity thereof, and maintaining tension on the cloth during such translative movement in unbiasing direction.

6. The method of filtering dust laden air which comprises placing a bag formed of woven filter cloth arranged on a bias under tension in a lengthwise direction to cause the threads of the cloth to approach each other and thereby diminish the size of the interstices of the cloth, passing dust laden air into said bag to cause the dust to be deposited on the cloth, the increase in pressure of air inside the bag due to the blocking of the cloth by the dust causing lengthwise contraction and lateral expansion of the bag against the action of the tension thereon progressively as the dust accumulates on the cloth, and stopping the flow of air into said bag after a predetermined amount of dust has been deposited to allow the tension on the bag to extend the bag, such extending movement causing parallel threads of the cloth to move lengthwise and laterally relative to each other to loosen the dust from the cloth and cause it to fall away therefrom.

7. The process of filtering dust laden air which comprises placing a woven filter cloth under biasing tension to cause the parallel threads of the cloth to approach each other and thereby reduce the size of the interstices of the cloth, passing dust laden air through the cloth while under such tension to cause the dust to be deposited on the cloth, the restriction of the flow of air after a dust cake has been built up on the cloth, causing a relative translative movement in unbiasing direction between opposite edges of the cloth to cause the threads thereof to move away from each other and thereby increase the size of the interstices in the cloth to loosen the dust cake formed thereon, and maintaining tension on the cloth during such translative movement.

HENRY R. BLACK.